Nov. 14, 1939.     A. NAGEL     2,180,016

HEIGHT EQUALIZING ARRANGEMENT FOR PHOTOGRAPHIC CAMERAS

Filed June 15, 1938

August Nagel
INVENTOR

BY
ATTORNEYS

Patented Nov. 14, 1939

2,180,016

UNITED STATES PATENT OFFICE 2,180,016

HEIGHT EQUALIZING ARRANGEMENT FOR PHOTOGRAPHIC CAMERAS

August Nagel, Stuttgart, Germany, assignor to Eastman Kodak Company, Rochester, N. Y., a corporation of New Jersey Application June 15, 1938, Serial No. 213,867
In Germany July 24, 1937

7 Claims. (Cl. 95—86)

The present invention relates to cameras of the folding type, and more particularly to a height equalizing means for such cameras.

One object of the invention is the provision of a height equalizing member which is automatically moved to operative position when the camera bed is open, and automatically retracted to an inoperative position when the camera bed is closed.

Another object of the invention is the provision of such a height equalizing arrangement which is simple in construction, inexpensive to manufacture, reliable, and without any permanent external parts.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
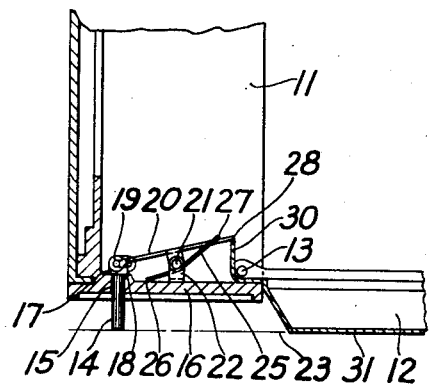
Fig. 1 shows a sectional elevation through a portion of a camera of the folding type, with the bed in open position, showing a height equalizing means constructed in accordance with one embodiment of the invention.

The present invention is embodied in an arrangement for supporting cameras of the folding type. This arrangement comprises, in general, a height equalizing member which is movable through an aperture in the camera body, and which cooperates with the camera bed to position the camera on a suitable support. This equalizing member is secured to, or formed integral with, one end of a lever which is pivoted intermediate its ends to the camera body. The other end of the lever engages a cam portion of the camera bed so that when the latter is opened the lever is pivoted in one direction to move the equalizing member into operative position to engage the camera support. When, however, the bed is closed, the lever is rotated in the opposite direction to draw or retract the equalizing member entirely within the chamber body.

The drawing shows a portion of a camera of the folding type comprising a body 11, and a bed 12 hingedly secured at 13 to the lower end of the camera body. As such structures may be of any suitable and well-known construction, and do not constitute a part of the present invention, a more detailed description is not deemed necessary to those familiar with the art.

Figure 2:
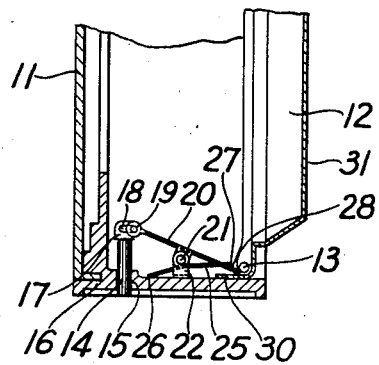
Fig. 2 is a view similar to Fig. 1, but with the bed in closed position, showing the height equalizing member in its retracted or inoperative position.

In the embodiment illustrated in Fig. 1, the height equalizing member is in the form of a rod 14 which is slidable in an aperture 15 formed in the bottom 16 of the camera body 11. The upper end of the rod 14 is provided with a head 17 having a slot 18 for slidably receiving one end 19 of a lever 20 pivoted intermediate its end at 21 on a bearing 22 formed on the body 11, all as shown in Figs. 1 and 2. It is apparent that if the lever 20 is rotated in a counter-clockwise direction, about its pivot 21, the rod 14 will move downwardly from its position shown in Fig. 2 to the position shown in Fig. 1 to engage a camera support, broadly indicated by the numeral 23. In this position the rod 14 cooperates with the outer surface 31 of the camera bed 12 to maintain the camera in position on the support 23.

A coil spring 25 is wrapped around the pivot 21, and has one end 26 thereof engaging the bottom 16 of the camera body, while the other end 27 is hooked over the rod 20 to hold the end 28 thereof in engagement with a lug or cam 30 formed on the bed 12 adjacent the hinge 13, as clearly illustrated in Figs. 1 and 2. Now when the bed 12 is moved from the closed position, as shown in Fig. 2, to the open position shown in Fig. 1, the end of the lug 30 engages and cams the end 27 of the lever 20 to rotate the latter in a counter-clockwise direction about the pivot 21. This movement of the lever 20 moves the rod 14 downwardly into engagement with the support 23. The rod 14 then cooperates with the outer surface 31 of the camera bed 12 to maintain the camera in proper position on the support 23. However, when the camera bed is closed, the bed and the lug 30 move about the hinge 13 to the position shown in Fig. 2. The spring 25 then acts on the lever 20 to rotate the latter in a clockwise direction to withdraw or retract the rod 14 within the camera body, and to maintain the end 28 of the lever 20 in engagement with the lug 30, as clearly illustrated in Fig. 2. Thus the opening of the bed automatically moves the height equalizing member 14 to operative position, while the closing of the bed automatically retracts or withdraws the member 14 to its inoperative position entirely within the camera body.

Figure 3:
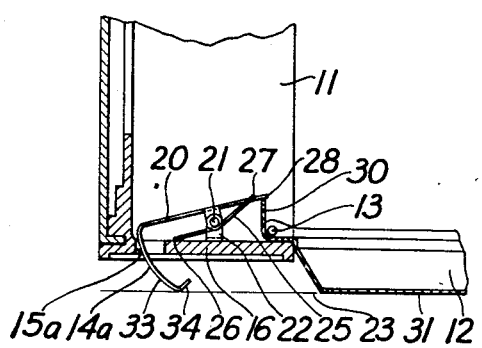
Fig. 3 is a view similar to Fig. 1, showing another type of height equalizing means.
Figure 4:
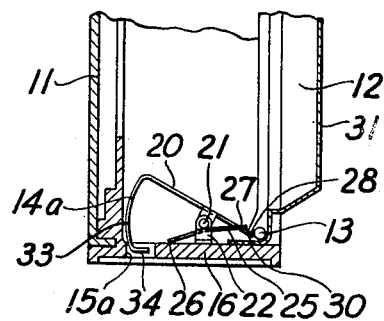
Fig. 4 is a view similar to Fig. 2, showing the height equalizing member illustrated in Fig. 3, in its retracted or inoperative position.

The modification shown in Figs. 3 and 4 differs from that above described only in that the height equalizing member 14a is formed from the material on the lever 20, and is arcuate in shape, as shown at 33. The arcuate portion 33 projects through an aperture 15a found in the bottom 16, and has the free end thereof bent to provide a supporting foot 34. Parts corresponding to those in Figs. 1 and 2 are designated by the same numerals.

Figure 5:
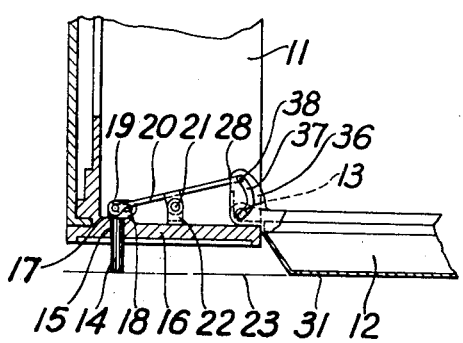
Fig. 5 is a view similar to Fig. 1, showing still another form of height equalizing means.
Figure 6:
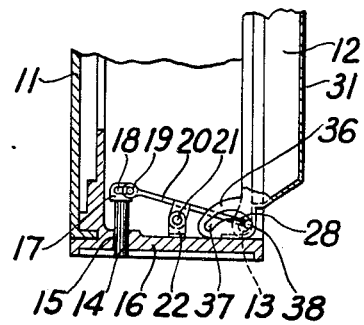
Fig. 6 is a view similar to Fig. 2, showing the height equalizing member illustrated in Fig. 5 in its retracted or inoperative position.

In the embodiment shown in Figs. 5 and 6, the camera bed 12 is utilized to both move the height equalizing rod 14 to operative position, as shown in Fig. 5, or to withdraw it within the camera body 11, as shown in Fig. 6. To secure this result, the bed 12 is provided with a plate 36 formed with an arcuate cam slot 37 adapted to receive a pin 38 formed on the end 28 of the lever 20. Parts corresponding to those above described are designated by the same numerals.

It is now apparent upon inspection of Figs. 5 and 6 that when the bed 12 is open, the pin 28 will be moved upwardly along the cam slot 37 to rotate the lever 20 and to move the rod 14 into engagement with the camera support 23. When, however, the bed is closed, the pin 28 will be drawn downwardly, as shown in Fig. 6, to retract the height equalizing rod 14 within the camera body.

It is thus apparent from the above description that the present invention provides a height equalizing member which is automatically moved to operative position when the camera bed is opened, and is automatically retracted to an inoperative position within the camera body when the camera bed is closed. It is also apparent that there are no permanent external parts to the height equalizing mechanism. Also the entire mechanism is exremely simple in its construction, and positive in its action.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. In a photographic camera, the combination with a camera body, and a camera bed hingedly connected to said body and formed with a portion arranged to be positioned below said body to engage a support when said bed is in open position, of height equalizing means comprising a member movably mounted on said body adjacent said hinge connection and arranged to be moved downwardly to engage said support to maintain said body in erect position and in spaced relation to said support when said bed is opened, and means on said bed adapted to engage said member to move said means into engagement with said support when said bed is moved to open position.

2. In a photographic camera, the combination with a camera body, and a camera bed hingedly connected to said body and formed with a portion arranged to be positioned below said body to engage a support when said bed is in open position, said body being formed with an opening adjacent said hinge connection, of a height equalizing member slidably mounted in said opening and arranged to be moved downwardly therethrough to engage said support to maintain said body in spaced relation thereto, and means operatively connecting said member to said bed so that upon moving the latter to open position will automatically slide said member downwardly in said opening and into engagement with said support to maintain said body in erect position.

3. In a photographic camera, the combination with a camera body, and a camera bed hingedly connected to said body and formed with a portion arranged to be positioned below said body to engage a support when said bed is in open position, said body being formed with an opening adjacent said hinge connection, of a height equalizing member slidably mounted in said opening and arranged to be moved downwardly therethrough to engage said support to maintain said body in spaced relation thereto, means operatively connecting said member to said bed so that upon moving the latter to open position will automatically slide said member downwardly in said opening and into engagement with said support to maintain said body in erect position, and means for moving said member upwardly in said opening to retract said member within said body when said bed is moved to closed position.

4. In a photographic camera, the combination with a camera body, and a camera bed hingedly connected to said body and formed with a portion arranged to be positioned below said body to engage a support when said bed is in open position, said body being formed with an opening adjacent said hinge connection, of a height equalizing member slidably mounted in said opening and arranged to be moved downwardly therethrough to engage said support to maintain said body in spaced relation thereto, a lever pivoted on said body adjacent said hinge connection and having one end operatively connected to said member, means on said bed adapted to engage the other end of said lever to move said member downwardly and into engagement with said support when said bed is moved to open position, and resilient means engaging said lever to automatically move said member upwardly in said opening to retract said member within said body when said bed is moved to closed position.

5. In a photographic camera, the combination with a camera body, and a camera bed hingedly connected to said body and formed with a portion arranged to be positioned below said body to engage a support when said bed is in open position, said body being formed with an opening adjacent said hinge connection, of a height equalizing member slidably mounted in said opening and arranged to be moved downwardly therethrough to engage said support to maintain said body in spaced relation thereto, a lever pivoted on said body adjacent said hinge connection and having one end operatively connected to said member, a cam formed on said bed adjacent said hinge connection, said cam being positioned to engage the other end of said lever when said bed is moved to open position to pivot said lever in one direction to move said member downwardly through said opening and into engagement with said support, and a spring engaging said lever to move the latter in the opposite direction when said bed is moved to closed position to withdraw said member within said body.

6. In a photographic camera, the combination with a camera body, and a camera bed hingedly connected to said body and formed with a portion arranged to be positioned below said body to engage a support when said bed is in open position, said body being formed with an opening adjacent said hinge connection, of a lever pivoted on said body adjacent said hinge connection, said lever having one end thereof formed to provide a height equalizing member arranged to be moved downwardly through said opening and into engagement with said support to maintain said body in erect position and in spaced relation to said support, a portion of said bed being positioned to engage the other end of said lever to tilt the latter in one direction to move said member into engagement with said support, and a spring wrapped around the pivot of said lever and having a portion thereof engaging said lever to tilt the latter in the opposite direction to withdraw said member upwardly within said body when said bed is moved to closed position.

7. In a photographic camera, the combination with a camera body, and a camera bed hingedly connected to said body and formed with a portion arranged to be positioned below said body to engage a support when said bed is in open position, said body being formed with an opening adjacent said hinge connection of a height equalizing member slidably mounted in said opening and arranged to be moved downwardly therethrough to engage said support to maintain said body in spaced relation thereto, a lever pivoted on said body adjacent said hinge connection and having one end operatively connected to said member, a plate formed on said bed adjacent the hinge thereof, said plate being formed with a cam slot, and a pin on the other end of said lever extending into the slot of said plate to provide a pin and slot connection between said lever and said bed whereby the opening of said bed will tilt said lever in one direction to move said member downwardly through said slot and into engagement with said support, while the closing of said bed will automatically tilt said lever in the opposite direction to withdraw said member upwardly through said slot and within said body.

AUGUST NAGEL.